UNITED STATES PATENT OFFICE 2,543,215

PROCESS OF PREPARING ANTIBODY-RICH GLOBULIN FRACTIONS

John W. Williams and Harold F. Deutsch, Madison, Wis., assignors to Wisconsin Alumni Research Foundation, Madison, Wis., a corporation of Wisconsin No Drawing. Application June 3, 1947, Serial No. 752,288

7 Claims. (Cl. 260—112)

The present invention relates to biological preparations, and in particular antibody preparations. More specifically the present invention relates to improved processes for obtaining therapeutically useful antibody-rich globulin fractions from animal blood serum.

It has been known for some time that animal bloods, including plasmas and serums derived therefrom, contain in solution complex protein compounds and that the antibody or immune globulin fractions thereof are associated with the proteins known as the gamma globulins. Sometimes parts of these protein fractions are referred to in the scientific literature as "T," $\beta_2$, etc. globulins. Van der Scheer et al., J. Immunol., 40, 173 (1941); Deutsch et al., J. Biol. Chem. 165, 21 (1946). The available evidence indicates that many of the antibodies are gamma globulins. It has also been known for some time that antibody concentrates possess utility in the medical field for combatting infections of the type which result in the appearance of antibodies (antitoxins, agglutinins, etc.) in the blood stream, e. g. in treating human diseases such as measles, diphtheria, tetanus, gas gangrene, etc., as well as distemper, hog cholera, Newcastle disease, etc., in the veterinary field.

The prior processes for preparing antibody concentrates such as those which involve the ammonium sulfate salting-out and/or enzymatic digestion have proven in commercial operations to be difficult, extremely tedious and to result in the recovery of only about 40-70 per cent of the desired antibodies present in the plasma or serum. Attempts to separate or isolate the antibody-rich fraction by the previously proposed "isoelectric precipitation" of the various proteins from plasma employing ethanol have also proven tedious and relatively unsatisfactory. (Cf. Smith and Gerlough, J. Biol. Chem. 167, 679 (1947).) In this latter process, for example, all of the fractions were found without subsequent or repeated refractionations, to be highly contaminated by unwanted proteins except the albumin fraction (Fraction V), in which the albumin was obtained in a relatively pure state. During World War II several improved fractionating processes were proposed for isolating therapeutically useful antibody preparations. Illustrative procedures are described in the Deutsch et. al., J. Biol. Chem. publications: 164, 93; 164, 109, and 165, 21 (1946).

The starting material in the previously proposed isoelectric precipitation process has been plasma and in the above referred to improved processes, a plasma fraction known in the art as Fraction II+III, or modifications thereof such as Fraction III-1. Fraction II+III consists largely of beta-one and gamma globulins, but also contains some fibrinogen, alpha globulins, and albumin. These fractions are described by Cohn et al. in J. Clin. Invest., 23, 417 (1944) and in J. Am. Chem. Soc., 68, 459 (1946). In the continued search for improved processes for obtaining antibody concentrates, Fraction II+III has been worked up into an isohemagglutinin Fraction III-1, a prothrombin Fraction III-2, and an immune globulin Fraction II. Only about one-half of the gamma globulins are recovered in Fraction II, and electrophoresis tests have demonstrated that Fractions III-1 and III-2 are far from homogeneous, and that the greater part of the antibodies not accounted for in Fraction II are present in Fraction III-1. Enders, J. Clin. Invest. 23, 510 (1944).

The prior processes employing complicated procedures, including the previously worked up plasma fractions of the type referred to above, possess obvious disadvantages. The prior processes, for example, requiring several steps with repeated fractionations are tedious and time consuming, e. g. require at least 4-5 days of difficult processing to obtain the antibody concentrate. Also, as the steps of a protein fractionating process increase there is inherently an increase in the loss of the desired antibodies during the processing, along with a corresponding increase in the danger of the introduction of pyrogens in the antibody fraction. In addition and aside from the expense involved in carrying out each individual step, repetitious treatments in certain processes in which the plasma or serum is subjected to foreign chemicals for relatively long periods of time, may have a deleterious effect on the antibody active proteins. The art has been attempting for some time to provide a relatively simple, economically feasible or commercially practical and inexpensive process for preparing in high yields, antibody preparations in the form desired for use in the medical field.

The principal object of the present invention is to provide an improved process for preparing antibody concentrates.

Another object of the present invention is to provide a relatively simple, commercially practical process for obtaining improved antibody preparations directly from blood serum.

Other objects will be apparent as the detailed description proceeds hereinafter.

We have discovered a new process for preparing antibody-rich protein fractions of the type desired directly from animal, e. g. human, horse, bovine, etc., blood serum. The new process provides for the isolation of substantially all of the antibodies from a single source (serum) containing all of the antibodies, and has proven to be a distinct improvement over the prior processes including the processes employing previously worked up plasma fractions. The new process of the present invention also provides for the concentration of antibodies by a relatively simple procedure particularly adaptable for use in large scale operations.

The improved process of the present invention comprises a single and relatively simple basic step which may or may not be followed by an additional treatment to remove non-antibody protein. Even if such additional treatment is employed, a period of time not exceeding two days will be required for the fractionation. This time element is extremely important for aside from making the process of the present invention relatively inexpensive, it has been found particularly advantageous as the serum proteins are in contact with the processing chemicals for such a limited time that there is substantially no danger when operating in accordance with the present invention, of protein denaturization resulting in unstable preparations or loss of antibody potency. In addition the process of the present invention with its single step reduces to a minimum the danger of the introduction of pyrogens into the antibody concentrates. The process of the present invention also gives exceptionally high yields, e. g. recovers consistently 90 to 100 per cent of the original antibodies present in the blood serum.

The following examples will serve to illustrate the present invention.

Example 1.—Antidiphtheric horse serum

To each volume of antidiphtheric horse serum are added about three volumes of distilled water. The pH of the system is then brought to about 7.6–7.7 either by the addition of 0.05 M acetic acid or aqueous 0.5 M sodium bicarbonate, depending upon whether the diluted serum is alkaline or acid to the desired pH. After cooling the solution nearly to its freezing point, precooled 50% aqueous ethanol is added until the final alcohol concentration is about 25%. At this point the ionic strength of the system is approximately 0.02±0.003. During the addition of the alcohol the temperature should be reduced gradually and as the final alcohol concentration of 25% is reached, the temperature should be about −7° C.

The precipitate which forms upon addition of the alcohol and which may be removed, for example, by centrifugation or filtration, is largely gamma globulins on electrophoretic analysis. It is high in antidiphtheric potency and contains substantially all of the immune globulins present in the original serum, and may be stored as a dry powder or be reconstituted in such solvents as 0.15 M UaCl (saline), 0.3 M glycine, etc., to form clear and stable solutions. In solution form it is ready for use, i. e. hypodermic administration, without further treatment.

If desired this precipitate may be subjected to an additional treatment to increase the antibody concentration. One thousand grams of the dry precipitate (or 3000–4000 grams of the wet paste) is suspended in 50 liters of pyrogen-free water. The pH of the system is brought to 5.4 by the careful addition of 0.05 M acetic acid.

The proteins which are precipitated and removed by centrifugation are largely inert as regards antibody activity. The supernatant solution which contains the antibody-rich gamma globulins is brought to a pH of 7.4 by the addition of 0.5 M NaHCO₃ and 50% aqueous ethanol is added until the final alcohol concentration is 25%. The gamma globulins are precipitated, and are recovered, suspended, frozen and dried.

Care must be taken right from the beginning that all solutions including the starting material are kept within a few tenths of a degree of their freezing point when any alcohol is present, although temperatures below −6° C. are not required. The mixing of one solution with another should always be done in such a way that temperatures do not increase. This is best accomplished by a pre-cooling of the aqueous alcohol to −10° C. or lower before addition. The use of low temperatures tends to prevent or minimizes denaturation of the proteins. In all cases the chemicals should be added slowly and with constant stirring.

Example 2.—Polyvalent horse serum

One liter of polyvalent horse serum is diluted to about 4000 ml. with distilled water and the diluted serum adjusted to a pH of about 7.7 by addition of dilute acidic or alkaline materials in accordance with Example 1. The solution is then cooled to about 0° C. and 4000 ml. of cold 50% ethanol is added with stirring, the temperature being maintained within 1° C. of the freezing point of the mixture until −6° C. is reached.

The precipitate which forms and which is recovered by centrifugation, contains more than 95 per cent of the desired serum gamma globulins. It is readily soluble in saline, 0.3 M glycine, etc., in which form it is ready for therapeutic use. It may also be dried in accordance with standard practices and be stored as a dry powder.

Example 3.—Polyvalent hyperimmune bovine serum

To each volume of bovine serum are first added about three volumes of distilled water. The pH of the diluted system is then adjusted to about 7.6–7.7 by the addition of either 0.05 M acetic acid or aqueous 0.5 M sodium bicarbonate, depending upon whether the starting serum is alkaline or acid to the desired pH. After cooling, sufficient pre-cooled 50% aqueous ethanol is added slowly and with stirring, until the final concentration of ethanol is about 20% by volume. At this point in the process the ionic strength of the system will be approximately 0.03.

The precipitate which forms upon addition of the alcohol and which may be removed by centrifugation, is largely gamma globulin on electrophoretic analysis. It contains substantially all of the immune globulins present in the original serum, and may be stored as a dry powder or be reconstituted in such solvents as 0.15 M NaCl (saline), 0.3 M glycine, etc., to form solutions which are ready for use without further treatment.

The antibody preparations prepared from bovine serum ordinarily contain a small percentage of beta-one globulins (or lipoproteins) originally present in the serum and the precipitate obtained above, if desired, may be subjected to the following additional treatment. For every one hundred grams of dry precipitate there are added 10,000 ml. of water, sufficient 0.05 M acetic acid to bring the pH of the system to 5.05±0.05 and sufficient 0.15 M sodium chloride to bring the ionic strength to 0.009±0.001. In this treatment the beta-one or lipoproteins are left behind as an insoluble residue, and the antibody-rich globulins remain in solution.

To precipitate the desired gamma globulins, 0.5 M sodium bicarbonate is added to the lipoprotein-free supernatant solution obtained above in amount sufficient to bring the pH of the solution to between 7.2 and 7.4. Following this addition aqueous ethanol is added to bring the ethanol concentration up to about 25% by volume. The precipitate which forms is composed of gamma globulins. It also contains substantially all of the antibodies present in the original serum, and may be stored as a dry powder or prepared in solution form as indicated above for hypodermic administration.

*Example 4.—Dog serum*

To one liter of dog serum is added about three liters of distilled water and the pH of the diluted solution adjusted to 7.7 (±0.1) by addition of aqueous acidic or alkaline solutions in accordance with Example 1. The solution is then cooled to about 0° C. and an equal volume of cold 50% ethanol is added slowly with stirring to give a final ethanol concentration of about 25%. The temperature is maintained near the freezing point of the mixture during the addition of the alcohol until a temperature of about −6° to −7° C. is reached. The precipitate which forms contains substantially all of the serum antibodies and after separation by centrifugation may be stored as a dry powder or prepared in solution form as indicated in the above examples. The precipitates obtained in this example, as well as the precipitates obtained in Examples 1 and 2, are ready for immediate use but if desired the precipitate of Example 4 may also be subjected to a similar and optional additional step of the type described under Examples 1 and 3. The procedure is the same except that the initial aqueous suspension of the antibody-rich precipitate is preferably adjusted to a pH of about 5.1–5.2, and the ethanol concentration is adjusted to 10% with a resultant ionic strength of about 0.001–0.003. The use of a "cleaning up" step of this type, however, is not necessary, as precipitates obtained by practicing applicants' improved process are ready for therapeutic use and require no further processing.

It will be understood that the above examples are for illustrative purposes only and that the present invention is not limited thereto. For example, we have found that serums with an alkaline pH of about 7.4–8.2 may be employed although a pH of about 7.6–7.7 is generally preferred. The ionic strength, i. e., concentration of electrolyte per volume, may vary in the system during precipitation from about 0.04 to 0.01 or even lower, although using applicants' dilutions, the salts, buffers, etc., present in the original serum ordinarily result in solutions having an ionic strength of about 0.01 to 0.04. It will also be understood that in addition to horse, bovine and dog serums employed in the above examples, any antibody containing normal, convalescent or hyperimmune serum obtained from human, goat, rabbit, guinea pig, rat, chicken, or other animal source may be employed in the process of the present invention. The pH of the system may be adjusted to the desired value by the addition of dilute non-toxic acidic or alkaline solutions, although the use of dilute acidic materials such as acetic acid and dilute alkaline materials such as aqueous sodium bicarbonate solutions are generally preferred.

Investigations have shown the dilution of the serum with water to be an essential step in the process of the present invention. The preferred procedures as set forth in the examples call for the addition of about three volumes of water to each volume of serum. More water may be employed, for example, in ratios of four, five or more volumes of water to one volume of serum. However, as the addition of large amounts of water increases the size of the system without resulting in any material improvement in the therapeutic effectiveness of the antibody precipitate, the use of over four or five volumes of water per volume of serum is without advantage. Less water may also be employed although ratios of around one or less volumes of water to one volume of serum have been found unsatisfactory as the precipitates obtained by using the smaller ratios of water are contaminated with larger amounts of unwanted materials including substantial percentages of beta-one globulins. Contaminated precipitates of this type ordinarily require purification such as the additional treatment outlined above in Example 3. It is for this reason, i. e. in order to keep the desired precipitate substantially free from contamination and thus avoid the necessity for and added expense involved in additional treatments, that it is preferred to use at least two or three volumes of water to one volume of serum.

The ethanol employed in the processes of the present invention may contain varying amounts of water, e. g. 40–60%, although the use of aqueous mixtures containing about 50% alcohol is generally preferred in commercial operations.

As a final ethanol concentration of about 15 to 30 per cent by volume is ordinarily required, the use of dilute solutions, e. g. containing much less than 50% alcohol, necessitates the use of relatively large amounts of solution to provide the desired ethanol concentration. In most preferred operations the final ethanol concentration is about 20–25 per cent by volume. With different types of serum optimum conditions for precipitation of the desired antibody-rich precipitate may vary somewhat but fall within the specifications set forth above.

The serums employed in the present invention may be obtained from blood in accordance with standard practices. One of the preferred methods is to add oxalate to blood, remove the cells, add calcium chloride to the resulting plasma, and remove the fibrinogen as fibrin clots. The serums may also be prepared by merely recovering the serum from clotted blood, although this is somewhat objectionable due to difficulty encountered in recovering economical amounts of the serum from the blood clot. The antidiphtheric and polyvalent serums employed in the above examples may also be prepared from plasmas in accordance with standard practices in the art. Hyperimmune serums of this type, for example, may be prepared from the blood of animals immunized with toxoids of diphtheria, tetanus and gas gangrene and vaccines of Brucella, pertussis, pneumococcus and Newcastle, etc. All of the serums employed in the process of the present invention should be free from fibrinogen as this protein produces clots which render the antibody concentrates unacceptable for therapeutic use.

The process of the present invention, due primarily to its simplicity, differs materially from the previously proposed processes in that it provides for the rapid recovery and concentration of the desired antibodies practically without loss. The adjustment of the pH to an alkaline pH of 7.4–8.2 at the start of the precipitation is an essential difference from the prior art processes based on isoelectric precipitation. This principle, i. e. isoelectric precipitation, is not involved as such in the initial or only essential precipitation step of the present invention because this initial and useful precipitate is made up of several families of gamma globulins which have widely different isoelectric points. The process of the present invention by using applicants' dilutions ordinarily results in a final serum system of ionic strength in the range 0.01–0.04. High ionic strengths, i. e. above 0.04, usually indicate that the system has not been adequately diluted with water or aqueous ethanol and the products obtained from relatively concentrated systems of this type are generally contaminated with large amounts of unwanted materials. Low ionic strengths, i. e. below 0.01, usually indicate that the system has been highly diluted with water or aqueous ethanol and while the products obtained from relatively dilute systems of this type are not contaminated with any appreciable amounts of unwanted materials, the dilutions are such as to make their use impractical in most commercial operations.

We claim:

1. The process of preparing antibody-active gamma globulin preparations from animal blood serum containing antibodies which comprises diluting the serum with water, adjusting the diluted serum system to a pH of about 7.4–8.2, cooling the alkaline serum system to near its freezing point, adding cold aqueous ethanol to the cooled serum system until the final concentration of the ethanol is about 15–30 per cent by volume and the ionic strength of the system is about 0.01 to 0.04, maintaining the temperature of the system during the addition of the ethanol close to its freezing point by reducing the temperature of the system until the temperature is about −6° C., and recovering the resulting antibody-rich precipitate from the cold aqueous ethanol solution.

2. The process of preparing antibody-active gamma globulin preparations from animal blood serum containing antibodies which comprises diluting the serum with water, adjusting the diluted serum system to a pH of about 7.6–7.7, cooling the alkaline serum system to near its freezing point, adding cold aqueous ethanol to the cooled serum system until the final concentration of the ethanol is about 20–25 per cent by volume and the ionic strength of the system is about 0.01 to 0.04, maintaining the temperature of the system during the addition of the ethanol close to its freezing point by reducing the temperature of the system until the temperature is about −6° C., and recovering the resulting antibody-rich precipitate from the cold aqueous ethanol solution.

3. The process of preparing antibody-active gamma globulin preparations from animal blood serum containing antibodies which comprises adding water to the serum in a ratio of at least about two volumes of water to one volume of serum, adjusting the diluted serum system to a pH of about 7.4–8.2, cooling the alkaline serum system to near its freezing point, adding pre-cooled 40–60 per cent aqueous ethanol to the cooled serum system until the final concentration of the ethanol is about 15–30 per cent by volume and the ionic strength of the system is about 0.01 to 0.04, maintaining the temperature of the system during the addition of the ethanol close to its freezing point by reducing the temperature of the system until the temperature is about −6° C., and recovering the resulting antibody-rich precipitate from the cold aqueous ethanol solution.

4. The process of preparing antibody-active gamma globulin preparations from animal blood serum containing antibodies which comprises adding water to the serum in a ratio of about three volumes of water to one volume of serum, adjusting the diluted serum system to a pH of about 7.6–7.7, cooling the alkaline serum system to near its freezing point, adding pre-cooled 50 per cent aqueous ethanol to the cooled serum system until the final concentration of the ethanol is about 20–25 per cent by volume and the ionic strength of the system is about 0.01 to 0.04, maintaining the temperature of the system during the addition of the ethanol close to its freezing point by reducing the temperature of the system until the temperature is about −6° C., and recovering the resulting antibody-rich precipitate from the cold aqueous ethanol solution.

5. The process of preparing antibody-active gamma globulin preparations from antidiphtheric horse blood serum which comprises adding water to the serum in a ratio of about three volumes of water to one volume of serum, adjusting the diluted serum system to a pH of about 7.6–7.7, cooling the alkaline serum system to near its freezing point, adding pre-cooled 50 per cent aqueous ethanol to the cooled serum system until the final concentration of the ethanol is about 25 per cent by volume and the ionic strength of the system is about 0.01 to 0.04, maintaining the temperature of the system during the addition of the ethanol close to its freezing point by reducing the temperature of the system until the temperature is about −6° C., and recovering the resulting antibody-rich precipitate from the cold aqueous ethanol solution.

6. The process of preparing antibody-active gamma globulin preparations from polyvalent horse blood serum which comprises adding water to the serum in a ratio of about three volumes of water to one volume of serum, adjusting the diluted serum system to a pH of about 7.7, cooling the alkaline serum system to near its freezing point, adding pre-cooled 50 per cent aqueous ethanol to the cooled serum system until the final concentration of the ethanol is about 25 per cent by volume and the ionic strength of the system is about 0.01 to 0.04, maintaining the temperature of the system during the addition of the ethanol close to its freezing point by reducing the temperature of the system until the temperature is about −6° C., and recovering the resulting antibody-rich precipitate from the cold aqueous ethanol solution.

7. The process of preparing antibody-active gamma globulin preparations from dog blood serum containing antibodies which comprises adding water to the serum in a ratio of about three volumes of water to one volume of serum, adjusting the diluted serum system to a pH of about 7.7, cooling the alkaline serum system to near its freezing point, adding pre-cooled 50 per cent aquous ethanol to the cooled serum until the final concentration of the ethanol is about 25 per cent by volume and the ionic strength of the system is about 0.01 to 0.04, maintaining the temperature of the system during the addition of the ethanol close to its freezing point by reducing the temperature of the system until the temperature is about −6° C., and recovering the resulting antibody-rich precipitate from the cold aqueous ethanol solution.

JOHN W. WILLIAMS.
HAROLD F. DEUTSCH.

REFERENCES CITED

The following references are of record in the file of this patent:

UNITED STATES PATENTS

| Number | Name | Date |
|---|---|---|
| 2,390,074 | Cohn | Dec. 4, 1945 |
| 2,437,060 | Williams et al. | Mar. 2, 1948 |

OTHER REFERENCES

Cohn et al.: J. Amer. Chem. Soc., vol. 62, pp. 3396–3400, Dec. 1940.

"Memoranda and Communications on the Preparation of Normal Human Serum Albumin" (Dep't. of Physical Chemistry, Harvard Medical School, Boston, Mass.), pages 9, 10 and 13 (Feb. 11, 1942); pp. 128, 129 and 170 (July 19, 1943).

Cohn: Annals of Internal Medicine, vol. 26, March 1947, pp. 341–352.